UNITED STATES PATENT OFFICE.

MARC DARRIN, OF WILKINSBURG, PENNSYLVANIA, ASSIGNOR TO H. KOPPERS COMPANY, OF PITTSBURGH, PENNSYLVANIA, A CORPORATION OF PENNSYLVANIA.

RESIN AND PROCESS FOR MANUFACTURING THE SAME FROM CRUDE SOLVENT NAPHTHA.

1,297,328. Specification of Letters Patent. Patented Mar. 18, 1919.

No Drawing. Application filed September 6, 1918. Serial No. 252,966.

*To all whom it may concern:*

Be it known that I, MARC DARRIN, a citizen of the United States, residing at Wilkinsburg, in the county of Allegheny and State of Pennsylvania, have invented a new and useful Improvement in Resins and Processes for Manufacturing the Same from Crude Solvent Naphtha, of which the following is a full, clear, and exact description.

This invention relates to a new and useful light colored resin and to the manufacture of the same from crude solvent naphtha obtained from gas, tar, or petroleums, and is an improvement on the ordinary acid polymerization process, as hereinafter described.

Heretofore, in the manufacture of resin by the acid polymerization process, the polymerization of the resin-forming constituents of crude solvent naphtha has been effected by a single treatment or agitation with concentrated sulfuric acid, followed by distillation for the separation of the non-volatile resinified material from the non-resinified volatile oils. No provision is made in the ordinary acid process for the separation of certain dark colored and injurious resin-forming constituents which occur in crude solvent naphtha, such as dicyclopentadiene and styrolene. These substances are polymerized very quickly to black hard compounds by the action of acid. Neither of these substances is desirable in a resin, particularly when a light shade is required.

The object of this improvement and method of effecting same is therefore as follows:

First, I polymerize the dark resin-forming bodies by preliminary treatment with an acid of just sufficient strength to accomplish this result without being strong enough to polymerize either coumarones or indenes or similar bodies to an appreciable extent.

Second, I distil the partially washed solvent to effect the separation of the black resin-forming compounds which remain behind as a residue in the still, the non-polymerized coumarones and indenes distilling over with the other volatile oils occurring in crude solvent naphtha.

Third, I completely polymerize the coumarones and indenes in the distillate from the second operation by means of concentrated sulfuric acid, as in the case of ordinary acid polymerization process.

Fourth, I neutralize any excess of sulfuric acid by agitation with a dilute solution of caustic soda or other alkaline agent. The resulting sulfate is drawn off in solution in the aqueous layer.

Fifth, I separate the resin polymerized in the third operation from the volatile oil in which it is dissolved. Any ordinary distillation process may be employed for this purpose, or recourse may be advantageously had to the blowing process mentioned in my Patent No. 1,236,917, for method of recovering resin from benzol plant residues.

As a specific example of my method of treatment, I can use to advantage for the first acid wash 4% by volume of 50° Baumé sulfuric acid, and for the second acid wash 0.4% by volume of 65° Baumé sulfuric acid. It is possible to vary the per cents. and concentration of the first acid wash within fairly large limits. The limits of variation for the second acid wash are much narrower, and a poor quality of resin will be obtained if the above figures are greatly departed from.

All other proportions and methods of treatment mentioned in above operation are well known to those skilled in the art and need no further discussion.

The resin produced by my invention is not only lighter colored than ordinary acid polymerized paracoumarone resin, but it is purer, being practically free from dicyclopentadiene and styrolene. The melting point of my resin is intermediate between ordinary acid polymerized paracoumarone resin and the variety of heat-polymerized resin known as pyro-paracoumarone resin, *i. e.*, in the neighborhood of 100° C. An example of this resin is that produced by the process of the Sperr and Darrin Patent No. 1,263,813 of April 23, 1918. Its solubility in various organic liquids is greater than other resins produced from crude solvent naphtha, and for this reason, it is preferable for the manufacture of certain types of varnishes and other compositions. Chemically, my resin consists of practically pure paracoumarone and paracoumarone homologues represented by the formula $(C_{8+n}H_{8+2n}O)_x$ and para indene represented by the formula $(C_9H_8)_x$. The initial acid wash practically frees this material from certain injurious substances such as polymerized dicyclopentadiene, $(C_5H_6)_x$, and polymerized styrolene $C_8H_8)_x$.

Pyridin and other nitrogen bases occurring in crude solvent naphtha may be readily recovered from the first acid wash by usual processes. Likewise, if it should be desired to recover phenolic compounds from the crude solvent naphtha, this may be accomplished by a preliminary washing with a dilute caustic solution in the usual manner. Intermediate or final water washes or soda washes may be employed without departing from the essence of my invention. Likewise, various other changes may be made in the details of the operation of my invention, and it will be obvious to those skilled in the art that the same may be modified in several ways without changing the operation or departing from my invention.

From the foregoing description of the invention, it will be clearly seen that I have devised a process particularly suitable for the production of light colored resins from crude solvent naphtha by means of special acid washing and double distillation treatment. It can further be clearly seen that I have devised a process in which all the points set out in the statement of my invention are fully attained and carried out.

For a definition of some of the terms employed herein, reference may be had to Patent No. 1,263,813, granted to F. W. Sperr, Jr., and myself on April 23, 1918.

Having stated the nature and object of my invention and having described the method and procedure, what I desire to secure by Letters Patent is defined in the appended claims.

I claim:

1. That step in the process of producing resin from a liquid containing compounds of the coumarone-indene group, which consists in initially treating the mixture with sulfuric acid of sufficient strength to polymerize dark resin-forming bodies without appreciable polymerization of the contained coumarone-indene compounds.

2. That step in the operation of producing resin from crude solvent naphtha, which consists in initially treating the crude solvent naphtha with sulfuric acid of sufficient strength to polymerize the contained dark resin-forming bodies without appreciably polymerizing the contained light resin-forming compounds.

3. The steps in the process of producing resin from a liquid containing compounds of the coumarone-indene group, which consist in initially treating the mixture with a solution of sulfuric acid of sufficient strength to polymerize the contained dark resin-forming constituents without appreciably polymerizing the contained light resin-forming constituents, subsequently removing the dark resins by a distillation process, and then completing the polymerization of the light resin-forming compounds by treatment with a stronger solution of sulfuric acid.

4. The steps in the process of producing resin from crude solvent naphtha, which consists in treating the crude solvent naphtha with a solution of sulfuric acid of sufficient strength to polymerize the dark resin-forming constituents contained in the naphtha without appreciably polymerizing the light resin-forming constituents therein, subsequently removing the dark resin compounds by a distillation process, and then completing the polymerization of the light resin-forming bodies by treatment with a stronger solution of sulfuric acid.

5. The herein described process of producing resin from a liquid containing compounds of the coumarone-indene group, comprising the steps of subjecting the mixture to a primary acid polymerization treatment, distilling it, subjecting the distillate to a secondary acid treatment, redistilling, and blowing a gaseous fluid through the residue to remove volatile oils from the polymerized resin.

6. The herein described process of producing resin from crude solvent naphtha, comprising the steps of subjecting the crude solvent naphtha to a primary acid polymerization treatment, distilling it, subjecting the distillate to a secondary acid treatment, redistilling, and blowing a gaseous fluid through the residue to remove volatile oils from the polymerized resin.

7. The herein described process of producing resin from a liquid containing compounds of the coumarone-indene group, comprising the steps of subjecting the mixture to an initial treatment with a solution of sulfuric acid of sufficient strength to polymerize the dark resin-forming constituents without an appreciable polymerization of the coumarone-indene compounds, distilling the treated mixture for removal of dark resins, subjecting the distillate to a treatment with a stronger solution of sulfuric acid for the purpose of polymerization of the coumarone-indene bodies, neutralizing any excess of acid, redistilling, and blowing a gaseous fluid through the resulting light colored resin to remove volatile oils from the polymerized resin.

8. The herein described process of producing resin from crude solvent naphtha comprising the steps of subjecting the crude solvent naphtha to a primary acid treatment with a solution of sulfuric acid of sufficient strength to polymerize the dark resin-forming constituents without appreciably polymerizing the light resin-forming constituents, removing the dark resinified bodies by a distillation process, completing the polymerization of the light resin-forming bodies by a treatment with a stronger solution of sulfuric acid, neutralizing any excess of acid, redistilling, and blowing a gaseous fluid through the residue to remove volatile oils from the polymerization residue.

9. As a new article of manufacture, a light colored resin produced from crude solvent naphtha by acid polymerization, but practically free from dicyclopentadiene and styrolene, the melting point being intermediate between ordinary acid polymerized resin and heat polymerized resin, that is, in the neighborhood of about 100° C., and its solubility in most organic liquids being greater than that of ordinary resins produced from crude solvent naphtha.

10. As a new article of manufacture, a light colored resin produced from compounds of the coumarone-indene group by acid polymerization process coupled with a double distillation treatment, the resulting resin being lighter in color and more soluble in most organic substances than ordinary acid polymerized paracoumarone resin, the melting point being intermediate between that of ordinary polymerized paracoumarone and that of the variety of heat-polymerized resin known as pyro-paracoumarone resin, and being practically free from dicyclopentadiene and styrolene.

11. As a new article of manufacture, a light colored resin consisting of practically pure paracoumarone and its homologues, $(C_{8+n}H_{6+2n}O)_x$ and para indene $(C_9H_8)_x$, being practically free from polymerized dicyclopentadiene $(C_5H_6)_x$, and polymerized styrolene $(C_8H_8)_x$.

In testimony whereof, I have hereunto set my hand.

MARC DARRIN.

It is hereby certified that in Letters Patent No. 1,297,328, granted March 18, 1919, upon the application of Marc Darrin, of Wilkinsburg, Pennsylvania, for an improvement in "Resins and Processes for Manufacturing the Same from Crude Solvent Naphtha," errors appear in the printed specification requiring correction as follows: Page 1, line 105, at end of formula, for the plus sign (+) read $x$; page 2, line 2, before the formula insert a parenthesis; and that the said Letters Patent should be read with these corrections therein that the same may conform to the record of the case in the Patent Office.

Signed and sealed this 22d day of June, A. D., 1920.

[SEAL.]

M. H. COULSTON,

*Acting Commissioner of Patents.*

Cl. 134—26.

DISCLAIMER.

1,297,328.—*Marc Darrin*, Wilkinsburg, Pa. RESIN AND PROCESS FOR MANUFACTURING THE SAME FROM CRUDE SOLVENT NAPHTHA. Patent dated March 18, 1919. Disclaimer filed May 23, 1924, by the assignee, *The Koppers Company*.

Hereby disclaims initially treating a liquid containing compounds of the coumarone-indene group as specified in claim 1, except when followed by the separation of the polymerized dark resin-forming bodies from the liquid containing the unpolymerized coumarone-indene compounds and the subsequent treatment of such liquid with sulphuric acid so as to polymerize the coumarone-indene compounds.

Hereby disclaims initially treating the crude solvent naphtha as specified in claim 2, except when followed by the separation of the polymerized dark resin-forming bodies from the naphtha containing the unpolymerized light resin-forming compounds and the subsequent treatment of such naphtha with sulphuric acid so as to polymerize the light resin-forming compounds.

Hereby disclaims the light colored resin as defined in claim 11.

[*Official Gazette June 10, 1924.*]